March 19, 1940.  C. G. KRONMILLER ET AL  2,194,243
CONTROL MECHANISM
Filed Aug. 28, 1936  3 Sheets-Sheet 1
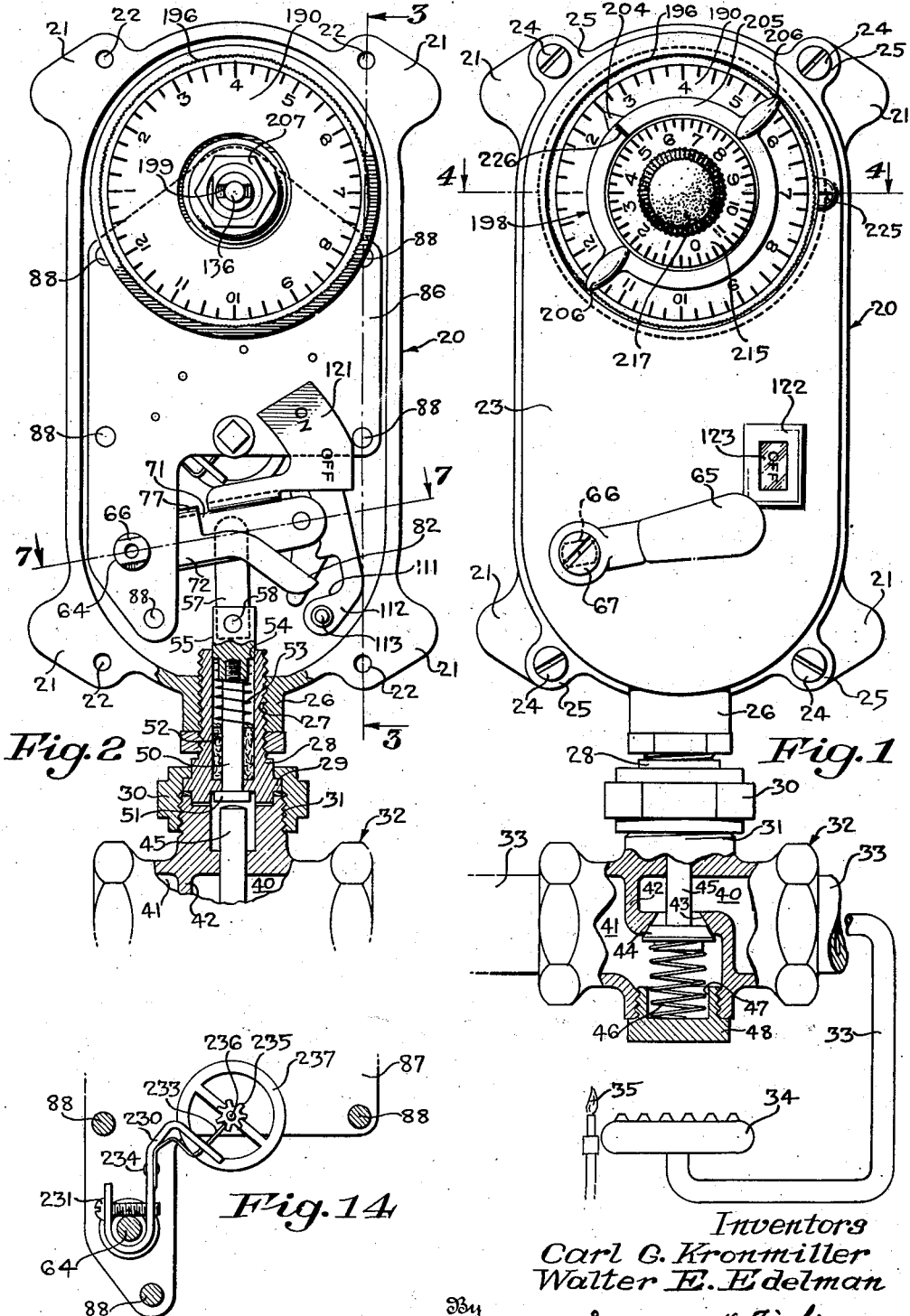
Inventors
Carl G. Kronmiller
Walter E. Edelman
By George H. Fisher
Attorney March 19, 1940.   C. G. KRONMILLER ET AL   2,194,243
CONTROL MECHANISM
Filed Aug. 28, 1936   3 Sheets-Sheet 2
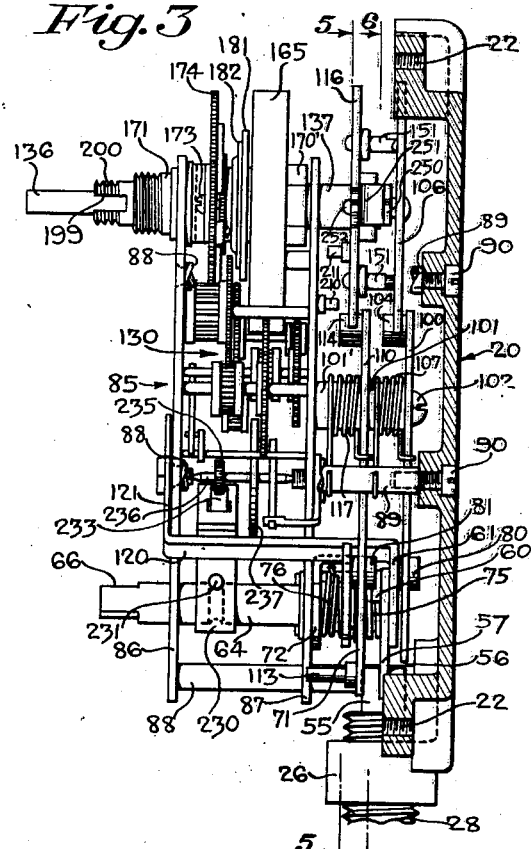
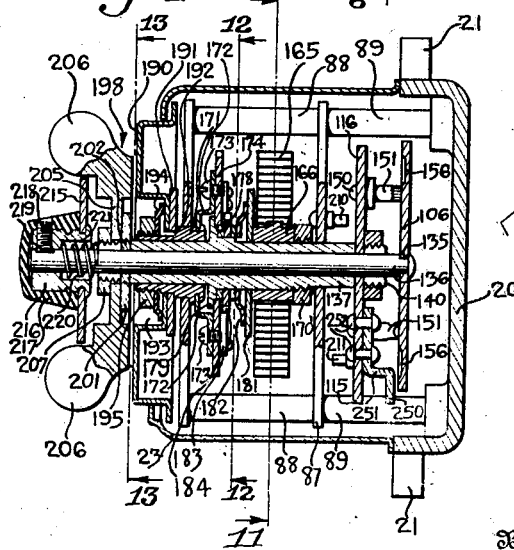
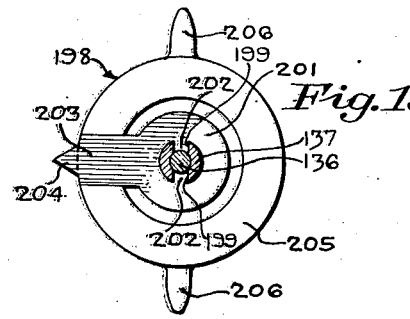
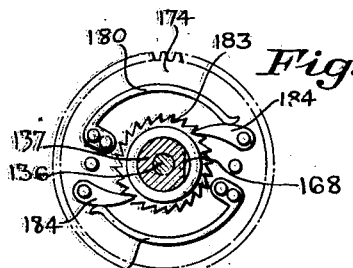
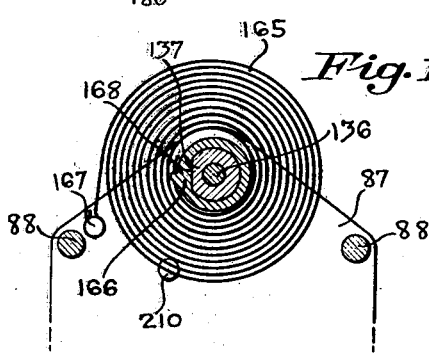
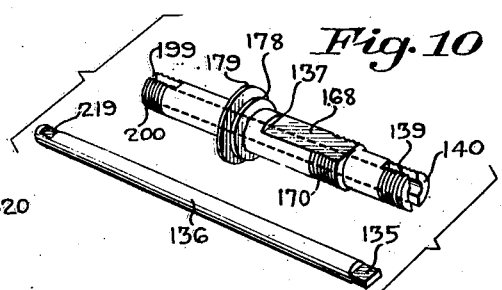
Inventors
Carl G. Kronmiller
Walter E. Edelman
By George H. Fisher
Attorney

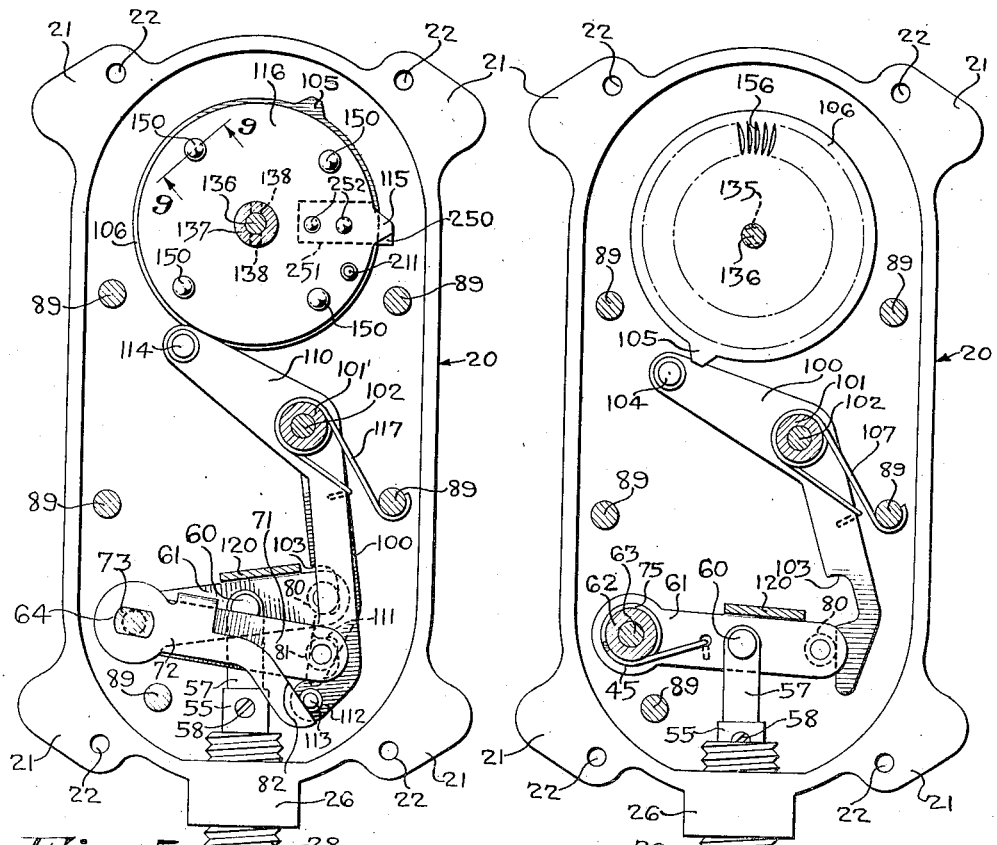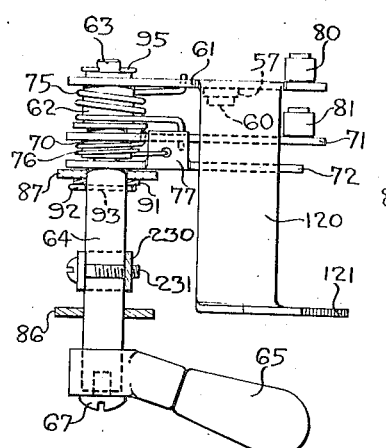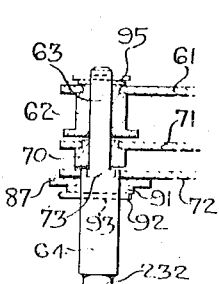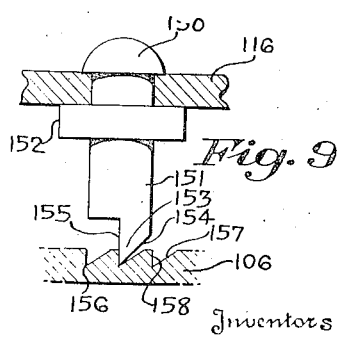

Patented Mar. 19, 1940

2,194,243

UNITED STATES PATENT OFFICE 2,194,243

CONTROL MECHANISM

Carl G. Kronmiller and Walter E. Edelman, Minneapolis, Minn., assignors to Minneapolis-Honeywell Regulator Company, Minneapolis, Minn., a corporation of Delaware Application August 28, 1936, Serial No. 98,327

7 Claims. (Cl. 161—9)

This invention relates to control mechanism and more particularly to a device adapted to control a supply of fuel to a burner through a valve.

One object of this invention is the provision of improved control mechanism so arranged that it may be set at any desired time and at a predetermined time subsequent thereto open a valve in a supply line to a burner and after a predetermined interval close the valve.

An additional object resides in the provision of a simplified dial arrangement whereby the setting of the instrument may be accomplished without the utilization of mental arithmetic.

A more specific object is the provision of an improved valve controlling mechanism including improved means associated with a clock mechanism to control the opening and closing of the valve.

A further object is the provision in a device as above mentioned and to be hereinafter described of means whereby the valve may be manually controlled at any desired time.

An additional object resides in the provision of means whereby an incorrect setting may be adjusted without the necessity of waiting for the clock mechanism to run its normal course. That is to say, if the burner is set to operate for a period of four hours, illustratively, in a manner to be hereinafter described, and the operator at any time subsequent thereto discovers that it is desired to have the burner operate for a period of only three hours, the mechanism may be set back readily and easily without the necessity for disassembly of or any change in the operating parts.

Other objects will in part be obvious and in part pointed out hereinafter.

The invention, accordingly, consists of the combinations of elements, arrangements of parts and features of construction all as will be more fully pointed out hereinafter and shown in the accompanying drawings and the scope of the application of which will be indicated by the appended claims.

As conducive to a clearer understanding of this invention, it may here be pointed out that in the use of a cooking stove or other related apparatus it is frequently desirable that certain comestibles be cooked for a period of hours prior to serving. Likewise, it frequently happens that the cook or housewife is unable to be present in the kitchen at these times at which it is desirable to turn the stove on and/or off in order that the comestible may be served at a desired hour. It is, accordingly, desirable to provide an automatic means whereby, without any intervention by the operator, the burners of the stove may be so arranged as to turn on at any predetermined time of day and turn off at such subsequent time as is desired, whereby upon leaving the house in the morning, the housewife or cook may adjust the mechanism of the instant invention, place the desired comestible in the oven or elsewhere upon the stove, set the mechanism in a manner to be described hereinafter and leave the house. The burner will be operated at the time at which the instrument is set and continue to burn until the comestible is thoroughly cooked, according to the predetermined setting, and then automatically turn off. Thus, if the instrument is properly adjusted, upon the return of the housewife the dinner will have been prepared and cooked without the necessity of her presence at any time during the cooking.

The mechanism hereinafter to be described is so arranged that, illustratively, the operator may leave the house at nine in the morning and by suitable adjustment of the mechanism cause the burner to start operation at, say three o'clock in the afternoon, and discontinue at, say 5:30, whereupon the food to be cooked will be ready for a six o'clock dinner upon her return. While the structure of the instant invention is particularly applicable to usages such as above described and is disclosed in connection with a burner for a cook stove or the like, it will be understood that it may equally well be applied to domestic heating apparatus or hot water heaters for domestic use or other related devices, and that while the mechanism is herein shown as operating a valve in a gas line, it may equally well operate a valve in an oil supply line or any other associated device in the related arts of burner or fuel supply control.

In the accompanying drawings wherein is shown an illustrative embodiment of the invention:

Figure 1 is a front elevational view of a structure embodying the instant invention partly in section, the cover to the apparatus being shown in position;

Figure 2 is a front elevational view of the device, the cover being removed, certain parts being shown in section and certain others being removed for the sake of clarity;

Figure 3 is a side sectional elevational view along the line 3—3 of Figure 2 as viewed from the right, certain parts thereof being cut away;

Figure 4 is a sectional view along the line 4—4 of Figure 1 as viewed from the top;

Figure 5 is a sectional view taken along the line 5—5 of Figure 3 as viewed from the left;

Figure 6 is a sectional view taken along the line 6—6 of Figure 3 as viewed from the left;

Figure 7 is a sectional view along the line 7—7 of Figure 2 as viewed from the top, certain parts being added;

Figure 8 is a sectional view taken through certain portions of the mechanism shown in Figure 7;

Figure 9 is an enlarged sectional view along the line 9—9 of Figure 5 as viewed at an angle from the lower right;

Figure 10 is an exploded perspective view of certain portions of the operating mechanism;

Figure 11 is a sectional view taken along the line 11—11 of Figure 4 as viewed from the left;

Figure 12 is a sectional view taken along the line 12—12 of Figure 4 as viewed from the right;

Figure 13 is a sectional view taken along the line 13—13 of Figure 4 as viewed from the right, and Figure 14 is a detail of certain features of the operating mechanism.

Similar reference characters refer to similar parts throughout the several views of the drawings.

Referring now to Figure 1, there is generally indicated at 20 a base plate provided with outwardly extending lugs 21 through which threaded apertures 22 (see Figure 2) are passed. A casing 23 is secured to base plate 20 as by means of screws 24 passing through suitable apertures in lugs 25 and engaging threaded apertures 22. At the lower portion of base plate 20 a downwardly depending projection 26 is formed and provided with a threaded bore 27 therethrough (see Figure 2). A sleeve 28 provided with a flange 29 threadedly engages bore 27. A lock nut 30 engaging flange 29 is threadedly secured to a threaded portion 31 of a valve assembly, generally indicated at 32, positioned in a supply line 33 leading to a conventional burner 34. A suitable pilot light 35 is positioned adjacent burner 34 and supplied with fuel in any desired manner. Valve assembly 32 is of conventional form and includes a pair of chambers 40 and 41 separated by a partition 42 having a bevelled edged aperture 43 therein, which aperture provides a seat for a valve 44 to which is rigidly attached a valve stem 45 which extends upwardly through a suitable aperture to a point adjacent the lower portion of sleeve 28. A spring 46 is set in a recess 47 in a nut 48 and engages the lower portion of valve 44 to normally hold the same firmly seated against valve seat 43. Nut 48 is removable in the conventional manner in order to provide ready access to the interior parts of the valve assembly 32 for cleaning or replacement.

As better shown in Figure 2, a rod 50 having an abutment 51 at one end thereof is passed through sleeve 28 in such a manner that abutment 51 is adjacent but normally slightly clear of the upper portion of valve stem 45. Such clearance is provided in order that a lost motion connection may exist between rod 50 and valve stem 45 whereby a slight motion accidentally imparted to rod 50 will not affect valve stem 45 but when a relatively large degree of movement is imparted to rod 50, in a manner to be hereinafter described, valve 44 may be displaced from its seat 43 by movement of rod 50. Suitable packing 52 is positioned about rod 50 to prevent any leakage from the valve assembly 32 through sleeve 28, and is held in position by a packing spring 53, one end of which abuts packing 52 and the other end of which abuts a flange 54 of a member 55. Rod 50 is threaded into a suitable aperture in member 55 for movement therewith.

As better shown in Figure 3, member 55 is provided with a slot 56 in which is positioned an end of a link 57 pivotally secured therein as by a screw 58. Screw 58 may be removed and forms except for lock nut 30 the sole link between the valve assembly 32 and the operating mechanism to be hereinafter described. It will thus be seen that if desired, screw 58 may be removed and sleeve 28 and its associated packing readily disassociated from depending portion 26 of base plate 20 for any desired purpose. The upper end of link 57 is secured, as by a pivot pin 60, to a lever 61 which is in turn secured to a collar 62 (see Figure 7) positioned for rotation about a reduced end 63 of an operating rod 64. The opposite end of operating rod 64 extends exteriorly of casing 23 and is provided, as best shown in Figures 1 and 7, with an operating handle 65. Operating handle 65 through its engagement with a flattened portion 66 formed at one end of operating rod 64 is so arranged that any movement imparted thereto is imparted directly to rod 64. A screw 67 engages a suitable threaded aperture in the extremity of operating rod 64 and serves to hold handle 65 and operating rod 64 in related assembly.

It will thus be seen that the valve 44 is seated and unseated with respect to valve seat 43 by movement of lever 61, such movement being imparted by operating handle 65 and other means to be hereinafter described, and provision, which will also be hereinafter described, being made to restrain the movement of lever 61 until such time as the instrument is set to operate. Also mounted on reduced end 63 of operating rod 64 is a collar 70 to which is rigidly secured a lever 71. A third lever 72 engages suitable flattened portions 73 of operating rod 64. Thus it will be seen that any motion of rod 64 is transmitted to lever 72 which must necessarily rotate therewith but that levers 61 and 71 may or may not move therewith in accordance with circumstances to be hereinafter described. A spring 75 is helically wound about collar 62 and its ends are secured in suitable apertures in levers 61 and 71, respectively, the arrangement being such that these levers are normally in alignment and motion of one lever is imparted to the other except when one or the other is retarded in a manner to be hereinafter described. Likewise, a spring 76 is helically wound about collar 70, one end thereof being suitably secured to lever 71, the other engaging a projection 77 carried by lever 72. Spring 76 also serves to maintain levers 71 and 72 in alignment except when such alignment is retarded in a manner to be hereinafter described.

A suitable projection 80 extends angularly from the end of lever 61 and a similar projection 81 is correspondingly positioned on lever 71. Lever 72 is provided with a depending portion 82 which comprises a cam surface, the purpose of which will also be hereinafter pointed out.

A suitable framework, generally indicated at 85, is positioned within casing 23 and secured to base plate 20. As better shown in Figure 3, framework 85 comprises a front plate 86 and a rear plate 87, suitable spacers 88 being provided to separate plates 86 and 87 and additional spacers 89 being provided to position rear plate 87 away from base plate 20. Suitable screws 90, as better shown in Figure 3, may engage apertures in spacers 89 in order to hold the framework 85 in related assembly with base plate 20.

Referring back to Figure 7, it will be seen that operating rod 64 is secured adjacent rear plate 87 as by means of a washer 91 secured in turn by a pin 92 passed through a suitable aperture 93 in operating rod 64. Likewise, a spring collar 95 engaged in a suitable groove adjacent the extremity of reduced portion 63 of rod 64 serves to retain collars 62 and 70 and operating levers 61, 71 and 72 and their associated mechanism in related assembly with operating rod 64.

Referring now to Figure 6, a bell-crank lever 100 is mounted on a sleeve 101 secured for rotation to rear plate 87 as by a rod 102 having a threaded end adapted to engage a suitable threaded aperture (not shown) in plate 87. Bell-crank lever 100 is provided, adjacent an extremity, with a recess 103 adapted to engage under circumstances to be later described with projection 80 carried by lever 61. At the opposite end of lever 100, a projection 104 similar in configuration to projection 80 is positioned in the path of rotation of a projection 105 carried by a disc 106, rotatable in a manner to be hereinafter described, disc 106 and projection 105 forming, in effect, a rotatable cam. One end of a coil spring 107 is hooked about a spacer 89 and the other end thereof is hooked about bell-crank lever 100 in such a manner that spring 107 normally tends to force that face of bell-crank lever 100 bearing recess 103 in a direction towards projection 80.

In Figure 5 a second bell-crank lever 110 is disclosed as mounted on a sleeve 101' similar to sleeve 101 likewise mounted on rod 102. Lever 110 also carries at its lower end a recess 111, as best shown in Figure 2, adapted to engage under certain circumstances with projection 81 carried by lever 71. An angularly disposed extension 112 of bell-crank lever 110 is provided with a pin 113, which is adapted under circumstances to be hereinafter described to abut cam surface 82 of lever 72. Lever 110 carries at its end opposite pin 113 a projection 114 similar to projection 104 positioned in the path of rotation of a projection 115 carried by a disc 116, disc 116 and projection 115 also forming a rotatable cam. Disc 116 is coaxially mounted with disc 106 as will be hereinafter pointed out. A spring 117 is mounted in a manner similar to spring 107 to normally hold the face of bell-crank lever 110 bearing recess 111 adjacent projection 81.

It may here be pointed out that lever 61 is provided with a forwardly extending portion 120, the outer end of which is provided with an upturned portion 121 which latter bears upon its outer surface indicia comprised of the words "on" and "off". An aperture 122 (see Figure 1) is provided in casing 23 and closed by a pane 123 of glass or other suitable transparent material. The arrangement is such that the word "off" is positioned adjacent aperture 122 when lever 61 is in its upper position, or in other words, when valve 44 is seated against valve seat 43. When lever 61 is in its lower position, as shown in Figure 6, valve 44 is opened and the indicia "on" appears adjacent aperture 122. Discs 106 and 116 are suitably rotated, in a manner to be hereinafter described, by a clock mechanism generally indicated at 130 (see Figure 3).

From the description of the device so far given, it will be seen that in the "off" or inoperative position of the device, the handle 65 is in its upper position, that valve 44 is normally held closed, that projection 80 is in engagement with recess 103 and that projection 81 held in alignment with lever 61 by spring 75 is out of engagement with recess 111. This position is shown in Figure 2. Now upon movement of operating handle 65 to its downward or operating position, recess 103 retains its engagement with projection 80 through the pressure of spring 107 and energy is stored in spring 75 by the downward movement of lever 71, which, when so moved, engages with recess 111 of bell-crank lever 110. Simultaneously, as lever 110 moves inwardly through the action of spring 117, pin 113 is permitted to move into abutting relation with cam surface 82 of lever 72. This portion of the parts is shown in Figure 5. At this point if it should be desired to turn the apparatus off manually, an upward movement of handle 65 will cause cam surface 82 of lever 72 to force pin 113 outwardly with respect thereto and consequently disengage projection 81 from recess 111 whereupon the parts are returned to the previously described inoperative position. However, assuming that such is not the case, and that it is desired to have the mechanism continue its normal operation, clockworks 130 revolve discs 116 and 106, in a manner to be hereinafter described, until projection 105 engages projection 104 to force the same away from disc 106, at which time bell-crank lever 100 will be forced outwardly against the pressure of spring 107 whereupon recess 103 will be disengaged from projection 80. The energy previously mentioned as being stored in spring 75 will then cause lever 61 to move downwardly abruptly whereupon through link 57, rod 50 and valve stem 45, valve 44 will be forced downwardly against the pressure of springs 46 and 53 to open the valve and permit fuel to pass through pipe 33 to burner 34 where it will be ignited by pilot 35. It will be understood that the strength of spring 75 is greater than that of springs 46 and 53 combined. After a predetermined interval, the method of predetermining which will also be pointed out hereinafter, projection 115 carried by disc 116 will engage projection 114 to force bell-crank lever 110 outwardly and release recess 111 from engagement with projection 81 whereupon spring 53 serves to force both levers 61 and 71 upwardly and spring 46 seats valve 44 tightly against valve seat 43 whereupon the device will discontinue operation until reset.

Disc 106 is secured in any suitable manner (see Figure 4) to flattened end portions 135 of a rod 136 (see Figure 10) which passes through a centrally positioned bore of a sleeve 137 which in turn is mounted in framework 85. Disc 116 is secured to sleeve 137, as better shown in Figure 5, by the engagements of suitable projections 138 with a slot 139 cut in the threaded end 140 of sleeve 137. Thus, it will be seen that disc 116 rotates with sleeve 137 and disc 106 rotates with rod 136.

Means, to be hereinafter described, are provided for driving sleeve 137 through clockworks 130 but disc 106 is driven only by its interengagement with disc 116. This interengagement may take the form of a plurality, illustratively four, of members 150 suitably secured to disc 116 as by peening the heads thereof. As better shown in Figure 9, members 150 comprise a shaft 151, a collar 152 and a tooth 153. Tooth 153 has an inclined surface 154 and a relatively perpendicular surface 155. The length of shaft 151 is such that the lower ends of teeth 153 are adapted to engage with a plurality of grooves 156 forming an annular band about disc 106, as better shown in Figure 6. Grooves 156 are formed, as shown in Figure 9, to have an inclined surface 157 and a relatively perpendicular surface 158. In the normal operation of the device, the direction of rotation is such that perpendicular faces 155 of teeth 153 engage perpendicular faces 158 of grooves 156 to provide a positive drive for disc 106. Upon reverse rotation of either disc, however, as when the mechanism is set, in a manner to be described hereinafter, inclined surfaces 154 and 157 may ratchet past each other. Suitable means are also provided, which will be discussed hereinafter, to disengage teeth 153 from grooves 156 entirely, when so desired.

Referring now to the means for driving sleeve 137, a conventional main spring 165 of clock mechanism 130 is disclosed in Figure 11 as having one end secured to a collet 166 and its other end to a suitable anchor shaft 167. Collet 166 is positioned to surround sleeve 137 and by engagement with a flattened portion 168 of sleeve 137, positive rotation thereof is insured. As previously stated, a conventional clock mechanism 130, the operation of which need not be discussed here, controls the unwinding of main spring 165 in such a manner that sleeve 137 is completely rotated at a very slow rate of speed as, in the illustrative embodiment herein given, once every 12 hours. A suitable nut 170' engaging with a threaded portion 170 of sleeve 137 prevents linear displacement of spring 165 and collet 166 in one direction. As better shown in Figure 4, a second sleeve 171 is mounted for rotation about sleeve 137. Secured in any desired manner to sleeve 171 is a pair of arms 172 to which in turn, as by screws 173, the main driving wheel 174 of clock mechanism 130 is secured. A washer 178 with a flange 179 which may be formed integrally with sleeve 137 is abutted by sleeve 171 to retain main driving wheel 174 in its desired position.

As better shown in Figure 12, conventional mechanism is provided to permit the tensioning of main spring 165 without displacing the remainder of clock mechanism 130. Such mechanism takes the form of a toothed wheel 183 and a pair of pivoted dogs 184 held in engagement therewith as by springs 180. Slip friction driving mechanism, comprising a washer 181 and a resilient spring disc 182 adjacent thereto is positioned between main spring collet 166 and wheel 183. Such mechanism is provided in order that wheel 183 may be rotated with sleeve 137 when dogs 184 are ratcheted past the teeth of wheel 183, that is, upon rotation of sleeve 137 in a clockwise direction as seen in Figure 12, but will slip with respect thereto upon counter-clockwise rotation. The arrangement therefor is such that spring 165 may be unwound if desired by rotation of sleeve 137 in a counter-clockwise direction. The advantages of this structure reside in the fact that should the operator inadvertently impart such tension to spring 165 as to cause the mechanism to run for a greater period than desired, the tension may be relieved by means of the slip friction mechanism above described. The friction afforded by disc 182, however, is sufficient to insure rotation of discs 106 and 116 through rotation of sleeve 137 imparted thereto by the normal unwinding of spring 165 transmitted to the sleeve through the clock mechanism including main driving wheel 174.

Referring now to Figures 1 and 4, a dial 190 is positioned on a suitable washer 191 adapted to abut a shoulder 192 of sleeve 171. Dial 190 has a centrally located recess 193 therein in which is positioned a spring collar 194 held in place by a nut 195 secured to a suitable threaded portion of sleeve 171. Dial 190 is provided, as better shown in Figures 1 and 2, with a plurality of indicating characters from 1 to 12 adjacent the periphery thereof and is, likewise, provided with a plurality of serrations 196 positioned about the periphery thereof in order to provide a secure finger grip. Dial 190 may rotate freely about sleeve 171 and consequently sleeve 137 but the frictional connection afforded by spring disc 194 is such that rotation of sleeve 171 transmitted through the clock mechanism 130 is in turn imparted to dial 190.

A second dial, generally indicated at 198, is superposed on the end of sleeve 137 which is provided with a groove 199 and threads 200. Dial 198 may be comprised of two parts, one of which consists of a securing member 201, as better shown in Figure 13, provided with lugs 202 adapted to engage slot 199 and an extending portion 203 provided with a pointer 204. The second portion of dial 198 comprises a rotatable disc 205 provided with ears 206 to afford a finger grip thereon. The members 201 and 205 may be connected in any suitable manner, as by the engagement of portion 203 with a suitable aperture in the rim of disc 205, or if desired, parts 201 and 205 may be formed as an integral unit. A nut 207 engaging threaded portion 200 of sleeve 137 serves to hold dial 198 in related assembly for rotation with sleeve 137.

From this, it will be seen that dial 190 provides indicating means, the purpose of which will be described hereinafter, whereas dial 198 provides means for winding the clock mechanism as well as means for positioning projection 115 with respect to projection 114. Upon rotation of dial 198 in one direction, the teeth of toothed wheel 183 ratchet past dogs 184 and main spring 165 is tensioned correspondingly and disc 116 is moved through its rigid related assembly with sleeve 137. When pointer 204 reaches a desired indicating mark on dial 190, the relative position of projection 115 with respect to projection 114 is indicated. However, upon reverse rotation of dial 198, spring 165 is unwound and projection 115 assumes a new position with respect to projection 114. It should here be pointed out that a suitable stop member 210 is positioned on rear plate 87 in the path of rotation of a second stop member 211 carried by disc 116 whereby disc 116 is permitted to make only one substantially complete rotation, the arrangement being such that spring 165 is tensioned by one complete rotation of dial 198 to impart motion to the mechanism for a period slightly in excess of the twelve hour period indicated thereby, to insure the continued operation of the mechanism for the desired operating period.

A third dial 215 is rigidly secured to a mounting member 216 (see Figure 4), about which is positioned a knob 217, these parts being held in related assembly with rod 136 by means of a screw 218 passed through suitable apertures in knob 217 and member 216 and engaging a flattened portion 219 adjacent the end of rod 136. A spring 220 is adapted to fit in a recess 221 of mounting member 216 and abuts nut 207. A slight clearance is provided between the lower side of member 216 and nut 207.

It will thus be seen that spring 220 through its pressure on member 216 serves to hold disc 106, through rod 136, tightly against projections 150 whereby rotation of dial 106 with dial 116 is insured. It will be seen, however, that by pressing to the right as viewed in Figure 4 on knob 217, spring 220 may be compressed and grooves 156 released from their engagement with teeth 153, under which circumstances dial 106 may be freely rotated and projection 105 positioned in any desired locality with respect to projection 104. Dial 215 is also provided with suitable indicating characters from 0 to 11. An indicating line 225 is positioned at a desirable location on casing 23 and a second indicating line 226 is positioned on the rim of disc 205 of dial 198 in alignment with pointer 204.

In setting the device, the operator first rotates dial 190 until a figure corresponding to the hour of the day is in alignment with indicating line 225. This will have no effect upon the interior mechanism of the device and simply serves as a suitable indication of the proper setting of the mechanism. Dial 198 is then rotated in a clockwise direction, as viewed in Figure 1, until pointer 204 is in alignment with the hour, as indicated on dial 190, at which it is desired that the burner turn off. Such rotation of dial 198, as previously pointed out, imparts tension to spring 165 to drive the clock mechanism for the desired period and positions projection 115 a distance away from projection 114 corresponding to the number of hours between the time of day as indicated by the number of dial 190 adjacent indicating line 225 and the time at which it is desired that the burner be turned off as indicated by the number adjacent pointer 204. The next step in setting the device consists in pushing knob 217 inwardly to overcome the tension of spring 220 and rotating the same until a number on dial 215 indicative of the number of hours which it is desired to have the burner in operation is opposite indicating line 226. This rotation, as will be seen, positions projection 105 a distance away from projection 104 equivalent to the number of hours between the time of setting and the time at which it is desired that the burner be turned on and, likewise, positions projection 105 a distance away from projection 115 corresponding to the number of hours it is desired to have the burner in operation.

The final step in the operation is the downward movement of handle 65 after which the apparatus may be left to function automatically.

In the arrangement as shown in Figure 1, it is thus to be assumed that the time of day is 7:00 o'clock in the morning, that it is desired to have a 3:00 dinner which should be cooked and ready to serve by 2:30, and that in order to insure the proper preparation of the dinner, it is necessary that the burner operate for a period of five hours.

It may here be pointed out that means are provided to insure starting of the clock mechanism upon downward movement of operating handle 65. Such means take the form, shown in Figure 14, of a member 230 having a U-shaped end portion through which is passed a screw 231 which engages a groove 232 in operating rod 64 (see Figure 8). A resilient member 233 is suitably secured to member 230, as by a rivet 234. The end of resilient member 233 engages the teeth of a gear 235 mounted on the balance staff 236 carrying a balance wheel 237 of the conventional clock mechanism 130. The arrangement is such that as handle 65 is moved in a downward direction, as viewed in Figure 1, resilient member 223 through its engagement with the teeth of gear 235 imparts relatively rapid movement to balance wheel 237 which movement once having started is transmitted to conventional reciprocatory movement through a conventional escape mechanism (shown only as a part of clockworks 130 in Figure 3), and continues through the energization provided by main spring 165.

Now from the foregoing, it will appear that when the apparatus is set in the manner above described, projection 80 being engaged by recess 103, lever 61 will not be moved by the movement of operating handle 65 but that lever 71 will be moved downwardly until it is in alignment with recess 111 whereupon spring 117 will force bell-crank member 110 inwardly until pin 112 is in alignment with cam surface 82 of lever 72. The indicating character "off" will appear in aperture 122 since lever 61 is in its upper position and valve 44 seated against valve seat 43. The mechanism will remain in this position until the rotation of disc 106 by clock mechanism 130 brings projection 105 into abutment with projection 104 whereupon bell-crank lever 100 will be moved to disengage recess 103 from projection 80. The energy stored in spring 75 will then be released to permit lever 61 to snap downwardly into alignment with lever 71 to unseat valve 44 from its valve seat 43. Upon further rotation, as above stated, projection 115 engages projection 114 to release projection 81 from recess 111 whereupon spring 46 forces valve 44 upwardly and, likewise, spring 53 adds impetus to such pressure to return levers 61, 71 and 72 to their upper or unset position. The clock mechanism will then continue to operate until stop 211 abuts stop 210 whereupon the mechanism will become inoperative and remain so until reset.

Suitable means for manual operation of the mechanism are also provided. As better shown in Figures 4 and 5, a projection 250 is positioned in alignment with projection 115 but spaced therefrom as by an angular bracket 251 secured to dial 116 as by rivets 252. Projection 250 is of slightly greater area than projection 115, as best shown in Figure 5. The arrangement is such that projection 250 will clear projection 114 but will abut projection 104 when the mechanism is completely unwound and held in its inoperative position by the abutment of stops 210 and 211. Thus, when the mechanism is in completely unwound position, projection 250 serves to hold bell-crank lever 100 in such position that recess 103 may not engage projection 80 and, consequently, manual operation of the device is permitted, since, under these circumstances, as operating handle 65 is moved downwardly, lever 61 moves therewith to open valve 44. Likewise, reverse motion of handle 65 causes cam surface 82 of projection 72 to abut pin 113 thus forcing recess 111 out of engagement with projection 81 whereupon the parts return to inoperative position and so remain until the device is reset by movement of operating handle 65.

From the foregoing it will be seen that there is herein provided an apparatus which accomplishes the objects of this invention in a thoroughly practical and reliable manner and includes many advantages of great practical importance.

As many embodiments may be made of this invention and as many modifications may be made of the above embodiment, it is to be understood that all matter hereinbefore set forth and disclosed in the accompanying drawings is to be interpreted as illustrative and not in a limiting sense.

We claim as our invention:

1. In combination, a device to be operated between a first and second position, means for biasing the device toward the first position, a first pivoted arm carrying a projection and operatively coupled with said device, a first lever having a detent to be engaged by the projection of the first arm when the device is in the first position, a second pivoted arm carrying a projection, a second lever having a detent adapted to be engaged by the projection of the second lever, resilient means operatively connecting the two pivoted arms, means for moving the second pivoted arm against the force exerted by said resilient means to move its projection into engagement with the detent of the second lever, time controlled means for moving the first lever to disengage the projection of the first pivoted arm from the detent of the first lever whereupon the resilient means moves the device to the second position, time controlled means for moving the second lever to disengage the projection of the second pivoted arm from the detent of the second lever whereupon the biasing means moves the device to the first position, and means for manually moving the second lever to release said second arm at any time while it is engaged by said detent.

2. In combination, a device to be operated between a first and second position, means for biasing the device toward the first position, a first pivoted arm carrying a projection and operatively coupled with said device, a first lever having a detent to be engaged by the projection of the first arm when the device is in the first position, a second pivoted arm carrying a projection, a second lever having a detent adapted to be engaged by the projection of the second lever, resilient means operatively connecting the two pivoted arms, means for moving the second pivoted arm against the force exerted by the resilient means to move its projection into engagement with the detent of the second lever, a first time controlled cam for moving the first lever to disengage the projection of the first pivoted arm from the detent of the first lever whereupon the resilient means moves the device to the second position, a second time controlled cam for moving the second lever to disengage the projection of the second pivoted arm from the detent of the second lever whereupon the biasing means moves the device to the first position, and means for manually moving the second lever to release said second arm at any time while it is engaged by said detent.

3. In combination, a device to be operated between a first and second position, means for biasing the device toward the first position, a first pivoted arm carrying a projection and operatively coupled with said device, a first lever having a detent to be engaged by the projection of the first arm when the device is in the first position, a second pivoted arm carrying a projection, a second lever having a detent adapted to be engaged by the projection of the second lever, resilient means operatively connecting the two pivoted arms, manual means for moving the second pivoted arm against the force exerted by the resilient means to move its projection into engagement with the detent of the second lever, a first time operated cam for moving the first lever to disengage the projection of the first pivoted arm from the detent of the first lever whereupon the resilient means moves the device to the second position, a second time operated cam for moving the second lever to disengage the projection of the second pivoted arm from the detent of the second lever whereupon the biasing means moves the device to the first position, means for adjusting the cams whereupon the times at which the device is moved to the second position and the first position may be adjusted at will, and means for moving the second lever to release said second arm comprising a cam on said manual means.

4. In combination, a device to be operated between a first and second position, means for biasing the device toward the first position, a first pivoted arm carrying a projection and operatively coupled with said device, a first lever having a detent to be engaged by the projection of the first arm when the device is in the first position, a second pivoted arm carrying a projection, a second lever having a detent adapted to be engaged by the projection of the second lever, resilient means operatively connecting the two pivoted arms, manual means for moving the second pivoted arm against the force exerted by the resilient means to move its projection into engagement with the detent of the second lever, a first time operated cam for moving the first lever to disengage the projection of the first pivoted arm from the detent of the first lever whereupon the resilient means moves the device to the second position, a second time operated cam for moving the second lever to disengage the projection of the second pivoted arm from the detent of the second lever whereupon the biasing means moves the device to the first position, means for adjusting the cams whereupon the times at which the device is moved to the second position and the first position may be adjusted at will, means for indicating the adjustment of the cams, and means for moving the second lever to release said second arm comprising a cam on said manual means.

5. In a device of the character described, in combination, a shaft, a first cam mounted for rotation therewith, a sleeve rotatably mounted on said shaft, a second cam mounted for rotation with said sleeve, mechanism operated by said cams, a spring fixedly secured to the sleeve, an escapement mechanism including ratchet means coupled with said sleeve whereby manual rotation of the sleeve in one direction tensions the spring for rotating the sleeve in the opposite direction under control of the escapement mechanism interlocking means on said cams, a second spring normally holding said interlocking means in operative position whereby said first cam is rotated upon rotation of said second cam, a pointer carried by said sleeve, a dial carried by said shaft, and a manual means associated with said dial for compressing said second spring to release said interlocking means whereby said first cam may be rotated in either direction relative to said second cam.

6. In a device of the character described comprising in combination, a shaft, said shaft being so mounted as to be both rotatable and longitudinally movable, a first cam mounted on said shaft, a sleeve rotatably mounted on said shaft, a second cam mounted on said sleeve, mechanism operated by said cams, a spring fixedly secured to said sleeve, an escapement mechanism including ratchet means coupled with said sleeve whereby manual rotation of the sleeve in one direction tensions the spring for rotating the sleeve in the opposite direction under the control of the escapement mechanism, interlocking means on said cams, a second spring normally urging said shaft in a direction to engage said interlocking means whereby said first cam is rotated upon rotation of said second cam, and manual means for moving said shaft against the bias of said second spring to disengage said interlocking means whereby said first cam may be rotated with respect to said first cam.

7. In a device of the character described comprising in combination, a shaft, said shaft being so mounted as to be both rotatably and longitudinally movable, a first cam mounted on said shaft, a sleeve rotatably mounted on said shaft, a second cam mounted on said sleeve, mechanism operated by said cams, a spring fixedly secured to said sleeve, an escapement mechanism including ratchet means coupled with said sleeve whereby manual rotation of the sleeve in one direction tensions the spring for rotating the sleeve in the opposite direction under the control of the escapement mechanism, interlocking means on said cams, spring means normally urging said shaft in a direction to engage said interlocking means whereby said first cam is rotated upon rotation of said second cam, a pointer carried by said sleeve, and a dial and knob carried by said shaft whereby said shaft may be manually longitudinally moved to disengage said interlocking means and then rotated to vary the relative rotative position of the cams, the dial and pointer indicating their relative positions.

CARL G. KRONMILLER.
WALTER E. EDELMAN.